(12) United States Patent
Kamiyama

(10) Patent No.: US 11,104,776 B2
(45) Date of Patent: Aug. 31, 2021

(54) LIQUID RESIN COMPOSITION

(71) Applicant: KANEKA CORPORATION, Osaka (JP)

(72) Inventor: Hiroshi Kamiyama, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 55 days.

(21) Appl. No.: 16/434,241

(22) Filed: Jun. 7, 2019

(65) Prior Publication Data

US 2019/0284361 A1    Sep. 19, 2019

Related U.S. Application Data

(63) Continuation of application No. PCT/JP2017/044068, filed on Dec. 7, 2017.

(30) Foreign Application Priority Data

Dec. 7, 2016  (JP) ............... JP2016-237866
Jan. 17, 2017  (JP) ............... JP2017-005626

(51) Int. Cl.
| | |
|---|---|
| C08J 9/08 | (2006.01) |
| C08K 3/26 | (2006.01) |
| C08K 5/42 | (2006.01) |
| C08J 9/04 | (2006.01) |
| C08L 71/02 | (2006.01) |
| C08K 5/09 | (2006.01) |

(52) U.S. Cl.
CPC . *C08J 9/08* (2013.01); *C08J 9/04* (2013.01); *C08K 3/26* (2013.01); *C08K 5/09* (2013.01); *C08K 5/42* (2013.01); *C08L 71/02* (2013.01); *C08J 2203/02* (2013.01); *C08J 2203/12* (2013.01); *C08J 2207/00* (2013.01); *C08J 2383/06* (2013.01)

(58) Field of Classification Search
CPC ... C08J 9/04; C08J 9/08; C08J 2203/02; C08J 2203/12; C08J 2207/00; C08J 2383/06; C08K 3/26; C08K 5/09; C08K 5/42; C08L 71/02
See application file for complete search history.

(56) References Cited

U.S. PATENT DOCUMENTS

| | | | | |
|---|---|---|---|---|
| 3,887,500 | A * | 6/1975 | Prokai | ............ C08G 77/46 521/111 |
| 6,683,043 | B1 | 1/2004 | Dovey et al. | |
| 2007/0117875 | A1 | 5/2007 | Horio | |
| 2010/0041810 | A1 | 2/2010 | Wakabayashi et al. | |
| 2011/0192564 | A1* | 8/2011 | Mommer | ............ H01M 10/658 165/10 |
| 2014/0228515 | A1 | 8/2014 | Vyakaranam et al. | |
| 2017/0226305 | A1 | 8/2017 | Katano et al. | |
| 2018/0118909 | A1* | 5/2018 | Jeromenok | ............ C08J 9/0004 |
| 2018/0312653 | A1 | 11/2018 | Katano | |

FOREIGN PATENT DOCUMENTS

| | | |
|---|---|---|
| JP | H10095909 A | 4/1998 |
| JP | 2000143853 A | 5/2000 |
| JP | 2001505195 A | 4/2001 |
| JP | 2002531686 A | 9/2002 |
| JP | 2006131755 A | 5/2006 |
| JP | 2013028819 A | 2/2013 |
| JP | 2014528496 A | 10/2014 |
| WO | 98020091 A1 | 5/1998 |
| WO | 00034422 A2 | 6/2000 |
| WO | 2013048806 A1 | 4/2013 |
| WO | 2016021630 A1 | 2/2016 |
| WO | 2017119396 A1 | 7/2017 |

OTHER PUBLICATIONS

International Search Report issued in International Application No. PCT/JP20171044068, dated Mar. 6, 2018 (4 pages).
Written Opinion issued in International Application No. PCT/JP2017/044068; dated Mar. 6, 2018 (3 pages).

* cited by examiner

*Primary Examiner* — John M Cooney
(74) *Attorney, Agent, or Firm* — Osha Bergman Watanabe & Burton LLP

(57) ABSTRACT

A liquid resin composition may include a base resin (A) in an amount of 100 parts by weight, a chemical foaming agent (B) in an amount of 2 parts by weight or more and 100 parts by weight or less, and water (C) in an amount of 1 part by weight or more and 30 parts by weight or less. The base resin may be a polymer that includes a hydrolyzable group bonded to a silicon atom, at least one reactive silicon group that is capable of being crosslinked by forming a siloxane bond, and a main chain that is constituted by an oxyalkylene-based monomer unit. The chemical foaming agent (B) may include a bicarbonate (B-1) and an acidic compound (B-2) having an acid dissociation constant pKa of 3.0 or less.

10 Claims, No Drawings

LIQUID RESIN COMPOSITION

TECHNICAL FIELD

One or more embodiments of the present invention relate to a modified silicone resin foam formed by curing an expandable liquid resin composition that includes a polymer, a foaming agent, and water, the polymer having a hydrolyzable group bonded to a silicon atom and having a silicon group that is capable of being crosslinked by forming a siloxane bond (hereinafter, referred to as "reactive silicon group").

BACKGROUND

Regarding foams of polymer compounds, foams formed from thermoplastic resins such as polystyrene, polyethylene, polypropylene, and polyvinyl chloride are known. Molded products of these foams (expansion molded products) are utilized in the field of civil engineering, the field of packaging, the field of electric appliances, the field of automobile, and the like, in the form of beads, sheets, boards, or the like, by making use of characteristics such as heat insulating properties, lightweightness, and shock-absorbing properties. For the production of such expansion molded products, large-scale facilities are needed. Furthermore, such expansion molded products are generally formed from hard foams.

As foams using thermosetting resins, which are formed by curing and expanding liquid resin compositions, foams of polyurethane are well known. Polyurethane foams can be formed simply with small-scale facilities, and can also be produced as soft foams (see Patent Document 1). However, the polyurethane foams may result in generation of toxic cyanogen gas at the time of combustion, and cracking caused deformation at the time of a seismic qualification test, which is attributed to insufficient flexibility at low temperature. Thus, there is a demand for a foam that is safe and can maintain flexibility even at low temperature.

On the other hand, at is possible to produce a foam even by using a modified silicone resin, depending on the conditions. Particularly, Patent Document 2 discloses a foam, which is a cured product of an expandable liquid resin composition including a modified silicone resin, a silanol condensation catalyst, and a chemical foaming agent. However, in a case in which the expandable liquid resin composition described in Patent Document 2 is used, since foaming requires high temperature conditions for a long time period, foaming in a field cannot be achieved, and there may be decreased productivity. Furthermore, in Patent Document 3, reduced-pressure foaming using a mixture of a polymer having a crosslinkable silyl group terminal and a curing catalyst, or foaming by foaming gas injection and mixing is disclosed. However, since high-pressure facilities are required for reduced-pressure foaming and foaming gas injection, foaming in a field at sites where foams are used is difficult.

Patent Document 1: Japanese Unexamined Patent Application, Publication No. 2006-131755

Patent Document 2: PCT International Publication No. WO2016/021630

Patent Document 3: Japanese Unexamined Patent Application, Publication No. 2000-143853

SUMMARY

One or more embodiments of the present invention provide a liquid resin composition that does not generate toxic cyanogen gas at the time of combustion, can maintain flexibility even at low temperature, and completes expansion molding in a short time period by mixing at room temperature.

One or more embodiments of the present invention provide a liquid resin composition that does not generate toxic cyanogen gas at the time of combustion, can maintain flexibility even at low temperature, and completes expansion molding in a short time period by mixing at room temperature, by subjecting a polymer having a reactive silicon group and having an oxyalkylene-based unit as a unit that constitutes the main chain, to silanol condensation. Thus, the inventor completed one or more embodiments of the present invention.

That is, one or more embodiments of the present invention have the following configuration.

1) A liquid resin composition including a base resin (A) in an amount of 100 parts by weight; a chemical foaming agent (B) in an amount of 2 parts by weight or more and 100 parts by weight or less; and water (C) in an amount of 1 part by weight or more and 30 parts by weight or less, in which the base resin (A) is a polymer having a hydrolyzable group bonded to a silicon atom, having at least one silicon group capable of being crosslinked by forming a siloxane bond (hereinafter, referred to as "reactive silicon group") in the molecular chain, and having an oxyalkylene-based unit as a unit constituting the main chain, and the chemical foaming agent (B) includes a bicarbonate (B-1) and an acidic compound (B-2) having an acid dissociation constant pKa of 3.0 or less.

2) The liquid resin composition according to 1), in which the liquid resin composition is a multi-liquid type composition of two-liquid type or more-liquid type.

3) The liquid resin composition according to claim 2, in which the liquid resin composition is a two-liquid type liquid resin composition and is composed of liquid A including the base resin (A) and the bicarbonate (B-1); and liquid B including the acidic compound (B-2) and the water (C).

4) The liquid resin composition according to any one of 1) to 3), in which the acidic compound (B-2) is an organic acid.

5) The liquid resin composition according to 4), in which the organic acid is a carboxylic acid or a sulfonic acid.

6) The liquid resin composition according to any one of 1) to 5), in which the repeating unit constituting the main chain of the base resin is oxypropylene.

7) The liquid resin composition according to any one of 1) to 6), in which the base resin (A) is a polymer having a number average molecular weight of 3,000 or more and 100,000 or less.

8) The liquid resin composition according to any one of 1) to 7), further including a silanol condensation catalyst (D).

9) The liquid resin composition according to any one of 1) to 8), further including hollow particles, a pigment, or a dye.

10) A method for producing a modified silicone resin foam, the method including curing and expanding the liquid resin composition according to any one of 1) to 9) in an atmosphere at a temperature of −10° C. or higher and −10° C. or lower.

11) A modified silicone resin foam, obtained by curing and expanding the liquid resin composition according to any one of 1) to 10).

12) The modified silicone resin foam according to 11), in which an ASKER FP hardness in an atmosphere at −20° C. is 60 or less.
13) The modified silicone resin foam according to 11) or 12), in which a density is 10 kg/m³ or more and 900 kg/m³ or less.
14) The modified silicone resin foam according to any one of 11) to 13), in which the modified silicone resin foam is used for a construction material or for an automobile.

Effects of the Invention

According to one or more embodiments of the present invention, a liquid resin composition that does not generate toxic cyanogen gas at the time of combustion, can maintain flexibility even at low temperature, and can form a modified silicone resin foam that has been expansion-molded by mixing at room temperature, can be provided. Furthermore, according to one or more embodiments of the present invention, a silicone resin foam that has excellent safety and flexibility at low temperature and is therefore suitably used as a material for use applications where seismic resistance is required, such as construction applications and various cushioning materials, can be provided. Furthermore, since expansion molding is completed in a short time period by mixing at room temperature at the time of foam production, in one or more embodiments it is possible to produce a foam with a facility of smaller burden of equipment.

DETAILED DESCRIPTION OF THE EMBODIMENTS

<<Liquid Resin Composition>>
The liquid resin composition of one or more embodiments includes a base resin (A) in an amount of 100 parts by weight; a chemical foaming agent (B) in an amount of 2 parts by weight or more and 100 parts by weight or less; and water (C) in an amount of 1 part by weight or more and 30 parts by weight or less. When such a liquid resin composition is cured and expanded in an atmosphere at a temperature of −10° C. or higher and 40° C. or lower, the modified silicone resin foam (hereinafter, also simply referred to as foam) that will be described below is formed. In the following description, the base resin (A), the chemical foaming agent (B), and water (C), which are constituent components of the liquid resin composition, will be described.
<Base Resin (A)>
In one or more embodiments, the base resin is a resin having at least one reactive silicon group in the molecular chain, in which the repeating unit constituting the main chain is formed from an oxyalkylene-based unit. The base resin (A) is a component that is cured by a silanol condensation catalyst. The base resin (A) has at least one reactive silicon group in the molecular chain. Therefore, the base resin (A) acquires a high molecular weight as a result of crosslinking by a silanol condensation reaction and is thereby cured.

In one or more embodiments, the number of reactive silicon groups included in the base resin needs to be at least one, from the viewpoint that the base resin undergoes a condensation reaction by a silanol condensation catalyst. From the viewpoints of curability and flexibility, it is preferable that a reactive silicon group exists at both ends of the molecular chain of the main chain or a branch portion of the base resin (A).

The reactive silicon group contained in the base resin (A) of one or more embodiments has a hydroxy group or a hydrolyzable group bonded to a silicon atom. Therefore, the reactive silicon groups can be crosslinked by formation of a siloxane bond by a reaction that is accelerated by the silanol condensation catalyst.

As the reactive silicon group of one or more embodiments, a group represented by General Formula (1):

$$-SiR^1_{3-a}X_a \quad (1)$$

in which R¹ each independently represents an alkyl group having 1 to 20 carbon atoms, an aryl group having 6 to 20 carbon atoms, an aralkyl group having 7 to 20 carbon atoms, or a triorganosiloxy group represented by the formula: —OSi(R')₃;
R' each independently represents a hydrocarbon group having 1 to 20 carbon atoms;
X each independently represents a hydroxy group or a hydrolyzable group;
and a represents an integer from 1 to 3, may be mentioned.

The hydrolyzable group is not particularly limited and may be any conventionally known hydrolyzable group. Specific examples include a hydrogen atom, a halogen atom, an alkoxy group, an acyloxy group, a ketoximate group, an amino group, an amide group, an acid amide group, an aminooxy group, a mercapto group, and an alkenyloxy group. Among these, a hydrogen atom, an alkoxy group, an acyloxy group, a ketoximate group, an amino group, an amide group, an aminooxy group, a mercapto group, and an alkenyloxy group are preferred. From the viewpoint of being mildly hydrolyzable and easily handleable, an alkoxy group is particularly preferred.

In one or more embodiments, the hydrolyzable group or hydroxy group can be bonded in a number in the range of 1 to 3 to one silicon atom. In a case in which two or more hydrolyzable groups or hydroxy groups are bonded to a reactive silicon group, they may be identical or different.

In the General Formula (1) described above, a is preferably 3, from the viewpoint that satisfactory curability is obtained, or it is easy to satisfactorily carry out curing and expansion at the same time by mixing of two liquids.

Specific examples of R¹ in the General Formula (1) of one or more embodiments include an alkyl group such as a methyl group or an ethyl group; a cycloalkyl group such as a cyclohexyl group; an aryl group such as a phenyl group; an aralkyl group such as a benzyl group; a triorganosiloxy group represented by the formula: —OSi(R')₃, in which R' is a methyl group, a phenyl group, or the like; a chloromethyl group; and a methoxymethyl group. Among these, a methyl group is particularly preferred.

More specific examples of the reactive silicon group include a trimethoxysilyl group, a triethoxysilyl group, a triisopropoxysilyl group, a dimethoxymethylsilyl group, a diethoxymethylsilyl group, and a diisopropoxymethylsilyl group. From the viewpoint of obtaining high activity and satisfactory curability, a trimethoxysilyl group, a triethoxysilyl group, and a dimethoxymethylsilyl group are preferred, and a trimethoxysilyl group is more preferred.

In one or more embodiments, the structure of the base resin (A) may be a straight chain structure or a branched structure. From the viewpoint of curability, a branched structure is preferred.

From the viewpoint of having a balance between viscosity and reactivity, the molecular weight of the base resin (A) of one or more embodiments is preferably 3,000 or more, and more preferably 10,000 or more, as the number average molecular weight Mn. The upper limit of the number average molecular weight Mn is not particularly limited; however, the number average molecular weight Mn is preferably 100,000 or less, more preferably 50,000 or less, and even more preferably 30,000 or less. Furthermore, the base resin (A) may be a combination of two or more kinds thereof. At that time, the polymer other than the polymer used as a main component may a polymer that does not satisfy the above-described conditions, in a case in which the polymer is intended to be used for the adjustment of viscosity and crosslinked structure.

In one or more embodiments, the repeating unit that constitutes the main chain of the base resin (A) is an oxyalkylene-based unit. Therefore, a base resin (A) having a main chain having a predetermined structure can be produced by polymerizing an alkylene oxide using a compound having two or more active hydrogen atoms as a starting material. For example, the base resin (A) can be produced by polymerizing a $C_2$ to $C_4$ alkylene oxide using ethylene glycol, propylene glycol, bisphenol compound, glycerin, trimethylolpropane, pentaerythritol, or the like as a starting materal. Furthermore, the oxyalkylene may be modified with a polyisocyanate compound.

In one or more embodiments, the reactive silicon group that is bonded to a terminal of the molecular chain of the base resin (A) can be introduced by modifying a hydroxyl group-terminated oxyalkylene group with an isocyanatosilane compound. As another method, a reactive silicon group can also be introduced by alkylating a hydroxyl group terminal and then performing hydrosilylation by means of an alkoxysilane. Furthermore, in a case in which the terminals of a polyisocyanate modification product are isocyanate groups, the modification product can be subjected to terminal modification with an aminosilane having active hydrogen, or the like.

Specific examples of the main chain of the base resin according to one or more embodiments of the present invention include, for example, polyethylene oxide, polypropylene oxide, polybutylene oxide; and random or block copolymers of two or more kinds selected from ethylene oxide, propylene oxide, and butylene oxide. From the viewpoint of flexibility at low temperature, the repeating unit of the main chain is more preferably polypropylene oxide.

<Chemical Foaming Agent (B)>

As the foaming agent in the liquid resin composition of one or more embodiments, a chemical foaming agent (B) is used. Regarding the chemical foaming agent, a chemical foaming agent formed from a bicarbonate (B-1) and an acidic compound (B-2) having an acid dissociation constant pKa of 3.0 or less, is particularly preferred. A chemical foaming agent including a bicarbonate (B-1) and an acidic compound (B-2) satisfactorily generates carbon dioxide gas concurrently with the curing reaction of the base resin (A) (silanol condensation reaction), but does not generate combustible gases such as hydrogen. Accordingly, a foam can be produced without using facilities with fireproof and explosion-proof options.

In a case in which the bicarbonate (B-1) and the acidic compound (B-2) of the chemical foaming agent are respectively a solid, it is preferable to use the compounds by uniformly mixing and dispersing the bicarbonate (B-1) and the acidic compound (B-2) that are respectively in a microparticulate form. The average particle size of the microparticles is preferably 40 μm or less, and more preferably 20 μm or less.

Examples of the bicarbonate include sodium hydrogen carbonate and ammonium hydrogen carbonate. A bicarbonate is also referred to as a hydrogen carbonate. The acidic compound having an acid dissociation constant pKa of 3.0 or less is preferably an organic acid, and more preferably a carboxylic acid or a sulfonic acid. Specific examples of the acidic compound include salicylic acid, chlorinated acetic acid, fluorinated acetic acid, and p-toluenesulfonic acid, and salicylic acid is particularly preferred. By selecting an acidic compound having a pKa of 3.0 or less, the pH of the liquid resin composition is lowered, and it becomes easy to carry out a curing reaction (silanol condensation reaction) and a carbon dioxide gas generation reaction. Among these, since it is preferable that carbon dioxide gas is generated in a pH region where the curing reaction of the base resin (A) (silanol condensation reaction) proceeds appropriately, a mixture of a bicarbonate such as sodium hydrogen carbonate or ammonium hydrogen carbonate and the above-mentioned organic acid is preferred, and a combination of sodium hydrogen carbonate and salicylic acid is particularly preferred.

In one or more embodiments, the content of the chemical foaming agent (B) is 2 parts by weight or more and 100 parts by weight or less, and preferably 5 parts by weight or more and 70 parts by weight or less, with respect to 100 parts by weight of the base resin (A). When the chemical foaming agent (B) is used in an amount in such a range, curing can be caused to proceed while sufficient foaming is achieved, and a foam having satisfactory flexibility and a sufficiently high expansion ratio is likely to be obtained. Furthermore, when the chemical foaming agent (B) is used in an amount in such a range, it is easy to achieve a balance between curing and expansion, and a preferable foam having foaming cells of adequate sizes is likely to be obtained.

In one or more embodiments, the content of the bicarbonate with respect to 100 parts by weight of the base resin (A) is preferably 1 part by weight or more and 50 parts by weight or less, and more preferably 2 parts by weight or more and 40 parts by weight or less. Furthermore, the equivalent ratio between the bicarbonate and the organic acid is, as the ratio of bicarbonate/organic acid, preferably 1/1 or more and 3/1 or less, and more preferably 1/1 or more and 2/1 or less. When the number of functional groups of the bicarbonate is smaller than the number of functional groups of the organic acid, organic acid remains and may cause moisture-induced rust generation. For example, since sodium bicarbonate has a molecular weight of 84 and one functional group, 15 parts by weight of sodium bicarbonate has a number of functional groups of 0.18 mol. Since salicylic acid has a molecular weight of 138 and one functional group, 22 parts by weight of salicylic acid has a number of functional groups of 0.16 mol.

As the foaming agent of one or more embodiments, a hydrocarbon gas, a chlorofluorocarbon gas, or the like can also be injected and used.

<Water (C)>

In one or more embodiments, water (C) accelerates the foaming reaction of the chemical foaming agent and the curing reaction of the base resin (A). The content of water (C) is 1 part by weight or more and 30 parts by weight or less, and even more preferably 2 parts by weight or more and 20 parts by weight or less, with respect to 100 parts by weight of the base resin (A). When the content of water (C) is less than 1 part by weight, curing proceeds while sufficient expansion does not occur, and a foam having insufficient flexibility and a low expansion ratio may be formed. Furthermore, when the content of water (C) is larger than 30 parts by weight, foaming occurs significantly compared to curing, and a defective foam containing excessively large foaming cells may be formed.

<Silanol Condensation Catalyst (D)>

The silanol condensation catalyst (D) of one or more embodiments is not particularly limited as long as it can be used as a condensation catalyst, and any arbitrary catalyst can be used. Specific examples of such a silanol condensation catalyst (D) include, for example, dialkyltin dicarboxylates such as dibutyltin dilaurate, dibutyltin diacetate, dibutyltin diethylhexanoate, dibutyltin dioctoate, dibutyltin dimethylmaleate, dibutyltin diethylmaleate, dibutyltin dibutylmaleate, dibutyltin diisooctylmaleate, dibutyltin ditridecylmaleate, dibutyltin dibenzylmaleate, dibutyltin maleate, dioctyltin diacetate, dioctyltin distearate, dioctyltin dilaurate, dioctyltin diethylmaleate, and dioctyltin diisooctylmaleate; for example, dialkyltin alkoxides such as dibutyltin dimethoxide and dibutyltin diphenoxide; for example, intramolecular coordination derivatives of dialkyltin, such as dibutyltin diacetylacetonate and dibutyltin diethylacetoacetate; reaction products between, for example, a dialkyltin oxide such as dibutyltin oxide or dioctyltin oxide and, for example, an ester compound such as dioctyl phthalate, ddisodecyl phthalate, or methyl maleate; tin compounds obtainable by reacting a dialkyltin oxide, a carboxylic acid, and an alcohol compound; for example, a reaction product between a dialkyltin oxide and a silicate compound, such as dibutyltin bis(triethoxysilicate) or dioctyltin bis(triethoxysilicate); tetravalent tin compounds such as oxy derivatives of the above-mentioned dialkyltin compounds (stannoxane compounds); for example, divalent tin compounds such as tin octoate, tin naphthenate, tin stearate, and tin versatate; reaction products and mixtures of the above-mentioned divalent tin compounds and amine-based compounds such as laurylamine that will be described below; for example, monoalkyltins including monobutyltin compounds such as monobutyltin trisoctoate and monobutyltin triisopropoxide, or monooctyltin compounds; for example, titanic acid esters such as tetrabutyl titanate, tetrapropyl titanate, tetra(2-ethylhexyl) titanate, isopropoxytitanium bis(ethylacetoacetate); organoaluminum compounds such as aluminum tris(acetylacetonate), aluminum tris(ethyl acetoacetate), and di-isopropoxyaluminum ethyl acetoacetate; salts of carboxylic acids such as 2-ethylhexanoic acid, neodecanoic acid, versatic acid, oleic acid, and naphthenic acid, with metals such as bismuth, iron, titanium, lead, vanadium, zirconium, calcium, potassium, barium, manganese, cerium, nickel, cobalt, zinc, and aluminum; reaction products and mixtures of the above-mentioned titanic acid esters or organoaluminum compounds and amine-based compounds such as laurylamine that will be described below; chelate compounds such as zirconium tetra(acetylacetonate), zirconium tri(butoxy acetylacetonate), dibutoxyzirconium diacetylacetonate, zirconium acetylacetonate bis (ethyl acetoacetate), and titanium tetra(acetylacetonate); aliphatic primary amines which may have unsaturated bonds, such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine, oleylamine, and cyclohexylamine; aliphatic secondary amines which may have unsaturated bonds, such as dimethylamine, diethylamine, dipropylamine, diisopropylamine, dibutylamine, diamylamine, ddoctylamine, di(2-ethylhexyl)amine, didecylamine, dilaurylamine, dicetylamine, distearylamine, methylstearylamine, ethylstearylamine, and butylstearylamine; aliphatic tertiary amines which may have unsaturated bonds, such as triamylamine, trihexylamine, trioctylamine, and triallylamine; aromatic amines such as laurylaniline, stearylanilne, and triphenylamine; as other amines, amine-based compounds such as monoethanolamine, diethanolamine, triethanolamine, diethylenetriamine, triethylenetetramine, oleylamine, cyclohexylamine, benzylamine, diethylaminopropylamine, xylylenediamine, ethylenediamine, hexamethylenediamine, trethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo(5,4,0)undecene-7 (DBU); salts between the above-described amine-based compounds such as aliphatic primary amines, aliphatic secondary amines, aliphatic tertiary amines, aromatic amines, and other amines, and carboxylic acids and the like; reaction products or mixtures of amine-based compounds and organotin compounds, such as a reaction product or a mixture of laurylamine and tin octoate; a low molecular weight polyamide resin obtainable from a polyamine in excess and a polybasic acid; a reaction product between a polyamine in excess and an epoxy compound; and aminosilanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, N-(β-aminoethyl)aminopropyltrimethoxysilane, N-(β-aminoethyl)aminopropylmethyldimethoxysilane, N-(β-aminoethyl)aminopropyltriethoxysilane, N-(β-aminoethyl)aminopropylmethyldiethoxysilane, N-(β-aminoethyl)aminopropyltriisopropoxysilane, γ-ureidopropyltrimethoxysilane, N-phenyl-γ-aminopropyltrimethoxysilane, N-benzyl-γ-aminopropyltrimethoxysilane, and N-vinylbenzyl-γ-aminopropyltriethoxysilane. Further examples include silanol condensation catalysts such as a silane coupling agent having an amino group, such as an amino-modified silyl polymer, a silylated amino polymer, an unsaturated aminosilane complex, a phenylamino long-chained alkylsilane, or an aminosilylated silicone, all of which are derivatives obtained by modifying the above-described aminosilanes, and known silanol condensation catalysts such as other acidic catalysts and basic catalysts, such as a fatty acid such as versatic acid, and an organic acidic phosphoric acid ester compound.

Examples of the organic acidic phosphoric acid ester compound as an acidic catalyst include $(CH_3O)_2-P(=O)(-OH)$, $(CH_3O)-P(=O)(-OH)_2$, $(C_2H_5O)_2-P(=O)(-OH)$, $(C_2H_5O)-P(=O)(-OH)_2$, $(C_3H_7O)_2-P(=O)(-OH)$, $(C_3H_7O)-P(=O)(-OH)_2$, $(C_4H_9O)_2-P(=O)(-OH)$, $(C_4H_9O)-P(=O)(-OH)_2$, $(C_iH_{17}O)_2-P(=O)(-OH)$, $(C_8H_{17}O)-P(=O)(-OH)_2$, $(C_{10}H_{21}O)_2-P(=O)(-OH)$, $(C_{10}H_{21}O)-P(=O)(-OH)_2$, $(C_{13}H_{27}O)_2-P(=O)(-OH)$, $(C_{13}H_{27}O)-P(=O)(-OH)_2$, $(C_{16}H_{33}O)_2-P(=O)(-OH)$, $(C_{16}H_{33}O)-P(=O)(-OH)_2$, $(HO-C_6H_{12}O)_2-P(=O)(-OH)$, $(HO-C_6H_{12}O)-P(=O)(-OH)_2$, $(HO-C_8H_{16}O)-P(=O)(-OH)$, $(HO-C_8H_{16}O)-P(=O)(-OH)_2$, $[(CH_2OH)(CHOH)O]_2-P(=O)(-OH)$, $[(CH_2OH)(CHOH)O]-P(=O)(-OH)_2$, $[(CH_2OH)(CHOH)C_2H_4]_2-P(=O)(-OH)$, and $[(CH_2OH)(CHOH)C_2H_4O]-(=O)(-OH)_2$. The organic phosphoric acid ester compounds are not limited to the exemplified substances.

From the viewpoint of carrying out a foaming reaction and a curing reaction in a well-balanced manner while causing the curing reaction to proceed rapidly, among the silanol condensation catalysts (D) mentioned above, acidic catalysts such as an organic acidic phosphoric acid ester compound are particularly preferred.

In one or more embodiments, the content of the silanol condensation catalyst (D) in the liquid resin composition is more than 0 parts by weight and 90 parts by weight or less with respect to 100 parts by weight of the base resin (A). The content is even more preferably 0.1 parts by weight or more and. 80 parts by weight or less. When a silanol condensation catalyst (D) is used in an amount in such a range, bottoming caused by compression is not likely to occur in the foam.

<Other Additives>

For the purpose of adjusting the flexibility or molding processability of the foam, a plasticizer, a reactivity regulating agent, and a dye can be added to the liquid resin composition of one or more embodiments.

Regarding the plasticizer of one or more embodiments, a polymer in which the repeating unit constituting the main chain is formed from an oxyalkylene-based unit. Specific examples of the main chain include polyethylene oxide, polypropylene oxide, polybutylene oxide; and a random or block copolymer of two or more kinds selected from ethylene oxide, propylene oxide, and butylene oxide. These may be used singly, or two or more kinds thereof may be used in combination. Among these, from the viewpoint of compatibility with the base resin (A), polypropylene oxide is preferred. Furthermore, polymers obtained by isocyanate-modifying these oxyalkylenes can also be added to the liquid resin composition.

The molecular weight of the plasticizer of one or more embodiments is, from the viewpoints of the flexibility of the foam thus obtainable, or the prevention of outflow of the plasticizer out of the system, 1,000 or more, and preferably 3,000 or more, as the number average molecular weight. When a plasticizer having a number average molecular weight in such a range is used, it is easy to suppress an outflow of the plasticizer over time out of the system caused by heat, compression or the like, and as a result, the initial physical properties can be easily maintained over a long time, while flexibility is less adversely affected. Furthermore, the upper limit of the number average molecular weight of the plasticizer is not particularly limited. From the viewpoint that the plasticizer has an appropriate viscosity and satisfactory workability, the number average molecular weight of the plasticizer is preferably 50,000 or less, and more preferably 30,000 or less. Meanwhile, the structure of the plasticizer is not particularly limited as long as flexibility can be imparted to the foam. The structure of the plasticizer may be, for example, linear or branched.

In one or more embodiments, the amount of addition of the plasticizer is preferably 5 parts by weight or more and 150 parts by weight or less, more preferably 10 parts by weight or more and 120 parts by weight or less, and even more preferably 20 parts by weight or more and 100 parts by weight or less, with respect to 100 parts by weight of the base resin (A). In the case of using a plasticizer in an amount in such a range, flexibility or molding processability of the modified silicone resin foam can be easily adjusted, and a foam having excellent mechanical strength and a sufficiently high expansion ratio is likely to be obtained. The method for producing a plasticizer is not particularly limited, and any known production method can be applied. Regarding the plasticizer, a commercially available compound may be used.

As the reactivity regulating agent, a compound having a reactive silicon group is preferred. Specific examples include a silicate compound. such as methyl silicate or ethyl silicate; a copolymer of a vinyl monomer having a reactive silicon group; and a copolymer that uses a reactive silicon monomer having a chain transfer group such as thiol. These may be used singly, or two or more kinds thereof may be used in combination.

In one or more embodiments, the molecular weight of the reactivity regulating agent is, from the viewpoint of curing and expansion of the modified silicone resin foam thus obtainable, preferably from 1,000 to 3,000 as the number average molecular weight. When the number average molecular weight is too low, it is difficult for the cell membranes formed at the time of expansion to be formed by curing, and the formation of foaming cells having excellent heat insulating properties may become difficult. Furthermore, the upper limit is not particularly limited; however, when the number average molecular weight is too large, viscosity increases, and workability is deteriorated. Therefore, the number average molecular weight is preferably 50,000 or less, and more preferably 30,000 or less. Meanwhile, the reactivity regulating agent is not particularly limited and may be linear or branched, as long as the reactivity regulating agent is capable of adjusting the curability of the modified silicone resin foam.

In one or more embodiments, the amount of addition of the reactivity regulating agent is preferably 2 parts by weight or more and 120 parts by weight or less, more preferably 5 parts by weight or more and 80 parts by weight or less, and even more preferably 10 parts by weight or more and 50 parts by weight or less, with respect to 100 parts by weight of the base resin (A). In a case in which the reactivity regulating agent is used in an amount in such a range, an effect of adjusting the curability is likely to be exhibited satisfactorily, and as the foam is cured at an appropriate speed, a foam having a desired expansion ratio is likely to be formed. The method for producing the reactivity regulating agent is not particularly limited, and any known production method can be applied. Regarding the reactivity regulating agent, a commercially available compound may be used.

In the liquid resin composition of one or more embodiments, a light-resistant stabilizer, an ultraviolet absorber, a storage stabilizer, a cell regulating agent, a lubricating agent, and the like may be added as necessary, as long as the effects of one or more embodiments of the present invention are not impaired.

Examples of the light-resistant stabilizer include a hindered phenol-based oxidation inhibitor, and a hindered amine-based photostabilizer that does not include a sulfur atom, a phosphorus atom, a primary amine, and a secondary amine. Here, the light-resistant stabilizer is a compound that has a function of absorbing light having a wavelength in the ultraviolet region and suppressing the production of radicals; a function of capturing a radical produced by light absorption, converting the radical into thermal energy, and thereby making the radical unharmful; or the like, and increases stability to light.

The ultraviolet absorber of one or more embodiments is not particularly limited. Suitable examples of the ultraviolet absorber include a benzoxazine-based ultraviolet absorber, a benzophenone-based ultraviolet absorber, a benzotriazole-based ultraviolet absorber, and a triazine-based ultraviolet absorber. Here, the ultraviolet absorber is a compound having a function of absorbing light having a wavelength in the ultraviolet region and suppressing the production of radicals.

In one or more embodiments, the amounts of the light-resistant stablizer and the ultraviolet absorber are respectively preferably 0.01 parts by weight or more and 5 parts by weight or less, more preferably 0.1 parts by weight or more and 3 parts by weight or less, and even more preferably 0.3 parts by weight or more and 2 parts by weight or less, with respect to 100 parts by weight of the base resin (A). When. the amounts of the light-resistant stabilizer and the ultraviolet absorber are in this range, an effect of suppressing an increase in the surface adhesiveness over time is likely to be obtained.

Preferred examples of the storage stability improving agent include a compound containing an aliphatic unsaturated bond, an organophosphorus compound, an organosulfur compound, a nitrogen-containing compound, a tin-based compound, and an organic peroxide. These may be used singly, or two or more kinds thereof may be used in combination. Specific examples of the storage stability improving agent include 2-benzothiazolyl sulfide, benzothiazole, thiazole, dimethylacetylene dicarboxylate, diethylacetylene dicarboxylate, 2,6-di-t-butyl-4-methylphenol, butylhydroxyanisole, vitamin E, 2-(4-morphodinyldithio) benzothiazole, 3-methyl-1-buten-3-ol, an acetylenic unsaturated group-containing organosiloxane, acetylene alcohol, 3-methyl-1-butyn-3-ol, 2-methyl-3-butyn-2-ol, diallyl fumarate, diallyl maleate, diethyl fumarate, diethyl maleate, dimethyl maleate, 2-pentenenitrile, and 2,3-dichloropropene.

In the liquid resin composition of one or more embodiments, if necessary, a cell regulating agent may be added. The type of the cell regulating agent is not particularly limited. Examples of the cell regulating agent include talc, calcium carbonate, magnesium oxide, titanium oxide, zinc oxide, a pigment such as carbon black, and an inorganic solid powder such as silica, which are conventionally used. These may be used singly, or two or more kinds thereof may be used in combination. Particularly, a black pigment such as carbon black may be expected to give a radiant heat-shielding effect and a membrane reinforcing effect.

In one or more embodiments, the amount of use of the cell regulating agent is preferably 0.1 parts by weight or more and 100 parts by weight or less, and more preferably 0.5 parts by weight or more and 50 parts by weight or less, with respect to 100 parts by weight of the base resin (A).

In the liquid resin composition of one or more embodiments, if necessary, a foam stabilizer may be added. The type of the foam stabilizer is not particularly limited. Examples of the foam stabilizer include silicone oil-based compounds such as a polyether-modified silicone oil, and fluorine-based compounds, which are conventionally used. These may be used singly, or two or more kinds thereof may be used in combination. Particularly, polypropylene-modified silicone and polyethylene-modified silicone may be expected to provide foam stabilizing power even with a small amount.

In one or more embodiments, the amount of use of the foam stabilizer is preferably 0.2 parts by weight or more and 30 parts by weight or less, and more preferably 0.5 parts by weight or more and 15 parts by weight or less, with respect to 100 parts by weight of the base resin (A).

In the liquid resin composition of one or more embodiments, if necessary, hollow particles may be added. The type of the hollow particles is not particularly limited. Regarding the hollow particles, for example, particles in which a conventionally used thermoplastic shell polymer encapsulates a volatile liquid that is converted to a gas phase at a temperature lower than or equal to the softening point of the shell polymer, and the volatile liquid that has been heated is converted to a gas phase, while the shell polymer is softened and expanded. Furthermore, it is also possible to add hollow particles before expansion, and to expand the hollow particles at the time of molding. The amount of use of the hollow particles is preferably 0.2 parts by weight or more and 30 parts by weight or less, and more preferably from 0.5 parts by weight or more and 15 parts by weight or less, with respect to 100 parts by weight of the base resin (A).

For the purpose of enhancing the compatibility of a liquid resin composition including a base resin (A), a chemical foaming agent (B), and water (C), a lubricating agent may be added. By using a lubricating agent, friction or self-adhesiveness in the foaming cells of the foam thus formed is reduced, and a foam having desired feeling of touch or flexibility can be obtained. Furthermore, this lubricating agent is maintained in a three-dimensional network structure formed between the base resin (A) by a silanol condensation reaction, and thereby bleed-out to the outside of the foam system tends to be suppressed. Therefore, it is easy to form a foam that maintains preferable feeling of touch or flexibility over a long time period.

Regarding the lubricating agent of one or more embodiments, a liquid lubricating agent is preferred. Specific examples of the liquid lubricating agent include paraffinic mineral oil, naphthenic mineral oil, animal and plant oils such as fatty acid glycerides; olefinic lubricating agents having an alkyl structure, such as poly-1-decene and polybutene; alkyl aromatic compound-based lubricating agents having an aralkyl structure; polyalkylene glycol-based lubricating agents; ether-based lubricating agents such as a polyalkylene glycol ether, a perfluoropolyether, and a polyphenyl ether; ester-based lubricating agents having an ester structure, such as a fatty acid ester, a fatty acid diester, a polyol ester, a silicic acid ester, and a phosphoric acid ester; silicone-based lubricating agents such as dimethylsilicone (that is, two-terminal trimethylsiloxy group-blocked dimethylpolysiloxane) and a silicone oil in which a portion of methyl groups of dimethylsilicone have been substituted by a polyether group, a phenyl group, an alkyl group, an aralkyl group, a fluorinated alkyl group, or the like; and fluorine atom-containing lubricating agents such as chlorofluorocarbons. These may be used singly, or two or more kinds thereof may be used in combination. From the viewpoint of a decrease in the coefficient of friction in foaming cells, or from the viewpoints of dispersibility, processability, safety, and the like, a silicone-based lubricating agent is particularly preferred.

In one or more embodiments, the amount of addition of the lubricating agent is preferably 1 part by weight or more, more preferably 2 parts by weight or more, and even more preferably 3 parts by weight or more, with respect to 100 parts by weight of the base resin (A). The upper limit of the amount of addition of the lubricating agent is not particularly limited. The amount of addition of the lubricating agent is preferably 25 parts by weight or less, and preferably 20 parts by weight or less, with respect to 100 parts by weight of the base resin (A). If the amount is too large, the expansion ratio of the foam is decreased, or bleed-out of the lubricating agent out of the system tends to occur. When a lubricating agent is used in an amount in such a range, friction or self-adhesiveness in the foaming cells, or bleed-out of the lubricating agent out of the system may be easily suppressed to a desired extent, and a foam having a sufficiently high expansion ratio and having desired feeling of touch or flexibility is likely to be formed.

<Method for Producing Foam>

The method for producing a modified silicone resin foam is not particularly limited as long as the liquid resin composition described above is used. An expandable liquid resin composition may be injected into a mold and then may be expanded and cured, or the expandable liquid resin composition may be expanded before the resin composition is cured or simultaneously with curing of the resin composition. Specifically, in one or more embodiments the modified silicone resin foam can be produced as follows.

First, a base resin (A), a chemical foaming agent (B), and water (C) are mixed with stirring, and a liquid resin composition is produced. Subsequently, the liquid resin composition is injected into a mold, or the liquid resin composition is suspended on a base material on a belt conveyor, or the like. Subsequently, without heating, curing and expansion of the liquid resin composition proceed, and a foam is obtained. For foaming in a field, a combination of a three-liquid type liquid resin composition including two or more liquids of a base resin (A), a chemical foaming agent (B), and water (C) is preferred, and a combination of a two-liquid type liquid resin composition composed of liquid A that includes a base resin (A) and a bicarbonate; and liquid B that includes an acidic compound having an acid dissociation constant pKa of 3.0 or less and water (C) is more preferred. In a case in which the combination of the composition is in this range, when a mixed system of three liquids or two liquids is used, continuous production is enabled. Examples of a method for mixing multiple liquids of two or more liquids include dynamic mixing having a stirring blade such as a dynamic mixer, and static mixing such as a static mixer. These mixing methods may be carried out in combination.

The time of completing curing and expansion is not particularly restricted. For example, a foam is obtained by leaving the system to stand for 12 minutes or less, and preferably 10 minutes or less.

In one or more embodiments, the mixing conditions for the liquid resin composition are preferably an atmosphere at a temperature of from −10° C. or higher and 40° C. or lower, and more preferably at a temperature of from 0° C. and higher and 37° C. or lower. When the mixing conditions are in this range, manually performed foaming in a field can be carried out for a long time.

<<Modified Silicone Resin Foam>>

The density of the modified silicone resin foam of one or more embodiments is preferably 900 kg/m$^3$ or less, and more preferably 50 kg/m$^3$ or less. In a case in which the density is in this range, for example, when the modified silicone resin foam is produced into manufactured products such as bedding, cushions, and heat insulating materials, the foam is relatively lightweight, and daily carrying is convenient. The lower limit of the density of the foam is not particularly limited. The lower limit of the density of the foam is preferably 10 kg/m$^3$ or more, and more preferably 70 kg/m$^3$ or more. In a case in which the density of the foam is in such a range, when the foam is used as bedding, a cushion, a heat insulating material, or the like, bottoming caused by compression does not easily occur.

In one or more embodiments, the ASKER FP hardness of the foam in an atmosphere at −20° C. is preferably 60 or less, and more preferably 50 or less. When the ASKER FP hardness in an atmosphere at −20° C. is in this range, for example, in the case of using the foam as a heat insulating material for housing, the heat insulating material does not easily crack due to deformation caused by a seismic qualification test of the house in an atmosphere at −20° C.

The form of the foam is not particularly limited. Examples of the form of the foam include a plate shape, a sheet shape, an indefinite bulk shape, a bead shape, a bag shape, and an apparel form. Furthermore, the foam may be used alone, or may be used integrally with a different type of foam such as a urethane foam; gel, plastic, rubber, film; a fabric product such as a fabric or a nonwoven fabric; or a material such as paper.

On the surface of the foam, a fabric or a nonwoven fabric formed from cotton, acrylic fibers, wool, polyester fibers, or the like may be bonded using an adhesive as appropriate. By bonding as such, softness of the foam is made more satisfactory, and depending on the use appication, a sweat-absorbing action can be provided by this pasted cloth at the time of exercising or at the time of sweating under high temperature and high humidity.

The shape of the foam is not particularly limited; however, examples include polygonal shapes such as a rectangular shape, a square shape, a circular shape, an elliptic shape, and a rhombic shape; a short strip shape; an internally hollowed shape such as a doughnut shape; and a shape having arbitrary concavities and convexities on the surface.

Since the foam of one or more embodiments has satisfactory flexibility at low temperature, the foam can be used for various use applications where such physical properties can be effectively exhibited. Furthermore, since isocyanate is not used, for example, the foam can be suitably utilized as a heat insulating material, a soundproof material, a damping material, a cushioning material, or the like in use applications, including transportation equipment use, bed and bedding use, furniture use, electrical and electronic instrument use, washing sponge use, toiletry use, footwear use, cosmetic tool use, miscellaneous goods use, medical use, sports goods use, toys and plaything use, and use applications such as construction materials, packaging materials, and medical materials.

Examples of use applications in which the foam of one or more embodiments can effectively exhibit excellent safety and flexibility at low temperature include, as a construction use application, a heat insulating material that will not crack due to deformation caused by a seismic qualification test, since the foam can maintain softness even at low temperature. Furthermore, in foaming in a field for construction, a foaming layer can be constructed in a seamless manner by expanding the foam with a two-liquid mixing gun and applying the foam. Therefore, attention is being paid to a two-liquid type liquid curable composition, from the viewpoints of air-tightness, heat insulating properties, and constructability (workability). In foaming of a two-liquid urethane in a field, harmful isocyanate compounds may scatter in air during construction of using a two-liquid mixing gun. Therefore, there is a demand for a safe product that will substitute the two-liquid urethane. Particularly in an automobile production line, since a shock-absorbing material, a soundproof material, and the like are molded by two-liquid foaming in a field, there is a demand for a safe product that will substitute products that generate harmful isocyanate compounds such as two-liquid urethane.

Examples of the transportation equipment use of one or more embodiments include seat materials for seats, child. seats, saddles for motorbikes, and saddles for bicycles; head rests; arm rests; foot rests; head liners; bed mats for custom cars; and cushions for camping cars. For these applications, the foam is used as a cushioning material, a skin material, a skin lining material, and the like. Furthermore, regarding the transportation equipment use, a ceiling material; a handle; door trim; an instrument panel; a dashboard; a door panel; a pillar; a console box; quarter trim; a sun visor; a flexible container; a front mirror; a safety belt; a dust cover; and the like are also preferable. For these use applications, the foam is used as a core material, a skin material, and a skin lining material. Furthermore, as the transportation equipment use applications, a damping, sound-absorbing material such as a floor cushion; shock-absorbing materials such as a helmet lining, a crash pad, and center pillar garnish; an energy absorbing bumper; a guard soundproof material; a sponge for vehicle waxing; and the like are also preferable. Examples of the transportation equipment include automobiles, motorbikes, bicycles, construction machines, railroad vehicles, ships, and aircrafts.

Examples of the bed and bedding use of one or more embodiments include pillows such as pillows and neck pillows for babies; futons such as comforters and futon mattresses; beds such as beds and baby beds; mats such as mattresses and bed mats; bed pads; and cushions. For these applications, the foam is used as a cushioning material, a skin material, a skin lining material, and the like.

Examples of the furniture use of one or more embodiments include chairs; seat chairs; floor cushions; sofas; various cushions such as sofa cushions and seat cushions; carpets and mats; futon mattresses and comforters for kotatsu; and toilet seat mats. For these use applications, the foam is use as a cushioning material, a skin material, a skin lining material, and the like.

Examples of the various equipment uses of one or more embodiments include sealing mater rials or shock-absorbing materials for liquid crystals, electronic components, and the like; skin of robots; electroconductive cushioning materials; antistatic cushioning materials; and pressure-sensitive materials.

Examples of the various washing sponge uses of one or more embodiments include cleaners for house cleaning; cleaners for dish washing; cleaners for body washing; shoe polishing cleaners; and cleaners for car washing.

Examples of the toiletry use of one or more embodiments include absorbent materials such as diapers and sanitary napkins, or side gathers; and various liquid filters.

Examples of the footwear use of one or more embodiments include skin materials for shoes, lining, insoles, shoe sore preventing pads, various shoe pads, inner boots, slippers, slipper cores, sandals, and sandal insoles.

Examples of the cosmetic tool use of one or more embodiments include cosmetic puffs and eye color tips.

Examples of the miscellaneous uses of one or more embodiments include bathtub goods such as bath pillows; massage puffs; mouse pads, arm rests for keyboards; non-slip cushions; stationery (pen-grips, infiltration stamping members); small pillows for desks; earplugs; cotton swabs; sheets such as hot pack sheets, cold pack sheets, and poultices; eyeglasses pads, pads for swimming goggles, wristwatch pads, headphone ear pads, pad materials for earphones and the like; face protectors; ice pillow covers; and folding pillows. For these use applications, the foam is used as a core material, a cushioning material, a skin material, and a skin lining material. Furthermore, examples of the miscellaneous use applications include double-sided tape base materials; and adsorption media for fragrances, inking pads, and the like.

Examples of the medical uses of one or more embodiments include pad materials such as shoulder pads, elbow pads, knee pads, hip pads, and brassier pads; liners for cold protection materials, and heat insulating materials.

Examples of the sports goods use of one or more embodiments include sports protectors; kickboards; and mats such as bouldering (climbing and mini-rock climbing of combining rocks at a height of 2 to 3 m) mats, landing mats for sports such as gymnastics and high jump, and kids mats. For these use applications, the foam is used as a cushioning material, a skin material, and a skin lining material. Furthermore, examples of the sports goods use include liners for ski boots, snowboard boots, and the like.

Examples of the toy and plaything use of one or more embodiments include hand exercisers; healing goods; key holders; stuffed. dolls; mannequin bodies; and ball massage balls. For these use applications, the foam is used as a cushioning material filler, a skin material, and a skin lining material. Furthermore, examples of the toy and plaything use include moulage materials for articles having various shapes represented by specially shaped objects such as decorations and monsters; casting materials for producing articles or models of various shapes by means of templates; materials for decoration production; and materials for producing special molded products such as monsters.

Examples of the medicine and nursing use of one or more embodiments include cell sheets for regeneration medicine, artificial skin, artificial bones, artificial cartilage, artificial organs, and biocompatible materials other than these materials; pad materials such as liquid drug exudation pads, hemostatic pads, electrode pads for low frequency therapy equipment, compression pads, and shock absorbing pads; gas-liquid separation filters (indwelling needle filters); poultices; medical liquid absorbing tools; masks; disposable products for operation, nursing goods such as bedsore preventive mattresses; position changing cushions; cushions for wheelchairs; seats for wheelchairs; and shower chairs; pillows for bathing care; palm protectors for contracture; tapings; liner materials such as liners for plaster casts and liners for artificial limbs and artificial legs; denture stands or dental goods other than denture stands; protectors such as hip protectors, elbow protectors, and knee protectors; and vulnerary covering materials.

EXAMPLES

Hereinafter, one or more embodiments of the present invention will be described in more detail by way of Examples; however, the present invention is not intended to be limited to these Examples.

Measurement and evaluations in Examples and Comparative Examples were carried out by the following conditions and methods. Unless particularly stated otherwise, the units "parts" and "percent (%)" in Examples and Comparative Examples represent "parts by weight" and "percent (%) by weight".

<Curability 1 of Foam>

In an atmosphere at 23° C., 10 cm$^3$ of a liquid resin composition was introduced into a cylinder type disco cup graduated at every 10 cm$^3$ and having a bottom face with a diameter of 5 cm. Next, the liquid resin composition was stirred. After the stirring, the time taken until the foam did not sag even when the disco cup was tipped was measured.

<Curability 2 of Foam>

In an atmosphere at 23° C., 10 cm$^3$ of a liquid resin composition was introduced into a cylinder type disco cup graduated at every 10 cm$^3$ and having a bottom face with a diameter of 5 cm. Next, the liquid resin composition was stirred. After the stirring, the time taken until the foam did not adhere even when the foam surface was touched with a hand was measured.

<Initial Expansion Ratio>

In an atmosphere at 23° C., 10 cm$^3$ of a liquid resin composition was introduced into a cylinder type disco cup graduated at every 10 cm$^3$ and having a bottom face with a diameter of 5 cm. Next, the liquid resin composition was stirred. From the foam volume at the time point where expansion stopped, the expansion ratio was calculated by the following formula. Expansion ratio=Foam volume at the time of measurement/10 cm$^3$ <Expansion Ratio After 12 Hours>

In an atmosphere at 23° C., 10 cm$^3$ of a liquid resin composition was introduced into a cylinder type disco cup graduated at every 10 cm$^3$ and having a bottom face with a diameter of 5 cm. Next, the liquid resin composition was stirred. The expansion ratio after 12 hours from the stirring was calculated from the foam volume after leaving the foam to stand for 12 hours in an atmosphere at 23° C. based on the following formula. Expansion ratio=Foam volume at the time of measurement (after 12 hours)/10 cm$^3$ <Density of Foam>

In an atmosphere at 23° C., cubes that measured about 30 mm on each side were cut out from the modified silicone resin foam after standing for 120 hours. Next, the weight (kg) and volume (m$^3$) of the cubes were measured. The volume was calculated from the lengths of three sides of a cube. The density (kg/m$^3$) of the foam was calculated by dividing the weight (kg) thus measured by the volume (m$^3$). The specific gravity was defined as 1.2 g/cm$^3$.

(Synthesis Example)

<Polymer A>

Polyoxypropylenetriol having a molecular weight of about 3,000 was used as an initiator, and polymerization of propylene oxide was carried out with a zinc hexacyanocobaltate-glyme complex catalyst. Thus, a hydroxyl group-terminated polyoxypropylene having a number average molecular weight of 16,400 was obtained. The number average molecular weight of the hydroxyl group-terminated polyoxypropylene was measured using a liquid feeding system (HLC-8120GPC manufactured by Tosoh Corp.), a column (TSK-GEL H type manufactured by Tosoh Corp.), and a solvent (THF), as a molecular weight calculated relative to polystyrene standards. A methanol solution of NaOMe in an amount of 1.2-fold equivalent with respect to the hydroxyl groups of this hydroxyl group-terminated polyoxypropylene was added to the polymer, and methanol was distilled off. Furthermore, 3-chloro-1-propene in an amount of 1.5-fold equivalent was added thereto, and the terminal hydroxyl groups were converted to allyl groups. To 100 parts by weight of the allyl group-terminated polyoxypropylene polymer thus obtained, 36 ppm of a platinum-divinyldisiloxane complex (a 3 wt % isopropyl alcohol solution in terms of platinum) was added. While the mixture was stirred, 3.3 parts by weight of triethoxysilane was slowly added dropwise thereto, and the mixture was caused to react for 2 hours at 90° C. Furthermore, 30 parts by weight of methanol and 12 ppm of HCl were added thereto to thereby convert the terminal ethoxy groups to methoxy groups, and then. excess methanol was removed. Thus, a reactive silicon group-containing branched polyoxypropylene having a trimethoxysilyl group at the terminals was obtained.

<Polymer B>

A polyoxypropylene diol having a molecular weight of about 3,000 was used as an initiator, and polymerization of propylene oxide was carried out with a zinc hexacyanocobaltate-glyme complex catalyst. Thus, a hydroxyl group-terminated polyoxypropylene having a number average molecular weight of 28,500 was obtained. The number average molecular weight of the hydroxyl group-terminated polyoxypropylene was measured in the same manner as in the case of polymer A, as a molecular weight calculated relative to polystyrene standards. A methanol solution of NaOMe in an amount of 1.2-fold equivalent with respect to the hydroxyl groups of this hydroxyl group-terminated polyoxypropylene was added to the polymer, and methanol was distilled off. Furthermore, 3-chloro-1-propene in an amount of 1.5-fold equivalent was added thereto, and the terminal hydroxyl groups were converted to allyl groups. To 100 parts by weight of the allyl group-terminated polyoxypropylene polymer thus obtained, 36 ppm of a platinum-divinyldisiloxane complex (a 3 wt % isopropyl alcohol solution in terms of platinum) was added. While the mixture was stirred, 1.2 parts by weight of triethoxysilane was slowly added dropwise thereto, and the mixture was caused to react for 2 hours at 90° C. Furthermore, 30 parts by weight of methanol and 12 ppm of HCl were added thereto to thereby convert the terminal ethoxy groups to methoxy groups, and then excess methanol was removed. Thus, a reactive silicon group-containing linear polyoxypropylene having a trimethoxysilyl group at the terminals was obtained.

<Polymer C>

A polyoxypropylene diol having a molecular weight of about 3,000 was used as an initiator, and polymerization of propylene oxide was carried out with a zinc hexacyanocobaltate-glyme complex catalyst. Thus, a hydroxyl group-terminated polyoxypropylene having a number average molecular weight of 28,500 was obtained. The number average molecular weight of the hydroxyl group-terminated polyoxypropylene was measured in the same manner as in the case of polymer A, as a molecular weight calculated relative to polystyrene standards. A methanol solution of NaOMe in an amount of 1.2-fold equivalent with respect to the hydroxyl groups of this hydroxyl group-terminated polyoxypropylene was added to the polymer, and methanol was distilled off. Furthermore, 3-chloro-1-propene in an amount of 1.5-fold equivalent was added thereto, and the terminal hydroxyl groups were converted to allyl groups. To 100 parts by weight of the allyl group-terminated polyoxypropylene polymer thus obtained, 36 ppm of a platinum-divinyldisiloxane complex (a 3 wt % isopropyl alcohol solution in terms of platinum) was added. While the mixture was stirred, 1.48 parts by weight of triethoxysilane was slowly added dropwise thereto, and the mixture was caused to react for 2 hours at 90° C. Furthermore, 30 parts by weight of methanol and 12 ppm of HCl were added thereto to thereby convert the terminal ethoxy groups to methoxy groups, and then excess methanol was removed. Thus, a reactive silicon group-containing linear polyoxypropylene having a trimethoxysilyl group at the terminals was obtained.

<Polymer D>

Butanol was used as an initiator, and polymerization of propylene oxide was carried out with a zinc hexacyanocobaltate-glyme complex catalyst. Thus, a hydroxyl group-terminated polyoxypropylene having a number average molecular weight of 7,000 was obtained. The number average molecular weight of the hydroxyl group-terminated polyoxypropylene was measured in the same manner as in the case of polymer A, as a molecular weight calculated relative to polystyrene standards. A methanol solution of NaOMe in an amount of 1.2-fold equivalent with respect to the hydroxyl groups of this hydroxyl group-terminated polyoxypropylene was added to the polymer, and methanol was distilled off. Furthermore, 3-chloro-1-propene in an amount. of 1.5-equivalent was added thereto, and the terminal hydroxyl groups were converted to allyl groups. To 100 parts by weight of the allyl group-terminated polyoxypropylene polymer thus obtained, 36 ppm by weight of a platinum-divinyldisiloxane complex (a 3 wt % isopropanol solution in terms of platinum) was added, and while the mixture was stirred, 1.72 parts by weight of dimethoxymethylsilane was slowly added dropwise thereto. The mixed solution was caused to react for 2 hours at 90° C., and thereby a linear polyoxypropylene having a dimethoxymethylsilyl group at the terminals was obtained.

Example 1

A base resin (A) [polymer A] and a chemical foaming agent (B-1) [sodium hydrogen carbonate: manufactured by Eiwa Chemical Industry Co., Ltd., FE-507] were added and sufficiently mixed, and thus liquid A was produced. A chemical foaming agent (B-2) [salicylic acid: first grade salicylic acid manufactured by Kishida Chemical Co., Ltd.], water (C), a silanol condensation catalyst (D) [2-ethyl acid phosphate (manufactured by Johoku Chemical Co., Ltd., acidic phosphoric acid ester, JP-502)] and a wetting agent [dimethylpolysiloxane KF-96-100CS manufactured by Shin-Etsu Chemical Co., Ltd.] were added and sufficiently mixed, and thus liquid B was produced. In an atmosphere at 23° C., liquid A and liquid B thus obtained were mixed in a mold or a graduated cylinder type disco cup, and a modified silicone resin foam was obtained. The mixing numbers of parts by weight and the evaluation results are presented in Table 1 and Table 6.

Example 2

The wetting agent of Example 1 was changed to a foam stabilizer [SRX-298 manufactured by Dow Corning Toray Co., Ltd.], and thus a modified silicone resin foam was obtained. The mixing numbers of parts by weight and the evaluation results are presented in Table 1.

Example 3

The mixing amount of water in Example 2 was reduced, and a modified silicone resin foam was obtained. The mixing numbers of parts by weight and the evaluation results are presented in Table 1.

Example 4

The mixing amount of water in Example 2 was reduced, and a modified silicone resin foam was obtained. The mixing numbers of parts by weight and the evaluation results are presented in Table 1.

Example 5

A plasticizer [hydroxyl group-terminated tetrabranched polypropylene oxide-based polymer, manufactured by Sanyo Chemical Industries, Ltd., FA702NS] was further incorporated into Example 2, and thus a modified silicone resin foam was obtained. The mixing numbers of parts by weight and the evaluation results are presented in Table 1.

Example 6

The base resin (A) of Example 2 was changed from [polymer A] to a mixture of [polymer A] and [polymer D] ([polymer A]/[polymer D]=80/20 (weight ratio)), and thus a modified silicone resin foam was obtained. The mixing numbers of parts by weight and the evaluation results are presented in Table 1.

Example 7

The wetting agent of Example 1 was changed to a foam stabilizer [SH190 manufactured by Dow Corning Toray Co., Ltd.], and thus a modified silicone resin foam was obtained. The mixing numbers of parts by weight and the evaluation results are presented in Table 1.

Example 8

The base resin (A) of Example 2 was changed from [polymer A] to [polymer C], and thus a modified silicone resin foam was obtained. The mixing numbers of parts by weight and the evaluation results are presented in Table 1.

Example 9

The amount of water (C) of Example 2 was increased to 6% by weight, and the amount of the silanol condensation catalyst (D) was increased to 50% by weight. Thus, a modified silicone resin foam was obtained. The mixing numbers of parts by weight and the evaluation results are presented in Table 1.

Example 10

The amount of water (C) of Example 2 was increased to 6% by weight, and the amount of the silanol condensation catalyst (C) was increased to 80% by weight. Thus, a modified silicone resin foam was obtained. The mixing numbers of parts by weight and the evaluation results are presented in Table 1.

Example 11

The chemical foaming agent (B-2) of Example 2 was changed to [chloroacetic acid: first grade chloroacetic acid manufactured by Kishida Chemical Co., Ltd.], and thus a modified silicone resin foam was obtained. The mixing numbers of parts by weight and the evaluation results are presented in Table 2.

Example 12

The amount of the chemical foaming agent (B-1) of Example 2 was increased to 15% by weight, the amount of the chemical foaming agent (B-2) was increased to 22% by weight, the amount of water (C) was increased to 9% by weight, and the amount of the foam stabilizer was increased to 10% by weight. Thus, a modified silicone resin foam was obtained. The mixing numbers of parts by weight and the evaluation results are presented in Table 2 and Table 6.

Example 13

A silicate [methyl silicate, manufactured by Mitsubishi Chemical Corp., MS56S] was further incorporated into Example 12, and thus a modified silicone resin foam was obtained. The mixing numbers of parts by weight and the evaluation results are presented in Table 2.

Example 14

A black pigment [carbon black, manufactured by Asahi Carbon Co., Ltd., ASAHI THERMAL] was further incorporated into Example 13, and thus a modified silicone resin foam was obtained. The mixing numbers of parts by weight and the evaluation results are presented in Table 2.

Example 15

Hollow particles [expanded microcapsules, manufactured by Matsumoto Yushi-Seiyaku Co., Ltd., MATSUMOTO MICROSPHERE F-80DE] were further incorporated into Example 13, and thus a modified silicone resin foam was obtained. The mixing numbers of parts by weight and the evaluation results are presented in Table 2.

Example 16

The amount of the silanol condensation catalyst (D) of Example 13 was reduced to 0% by weight, and thus a modified silicone resin foam was obtained. The mixing numbers of parts by weight and the evaluation results are presented in Table 2.

Example 17

The amount of water (C) of Example 13 was increased to 20% by weight, and thus a modified silicone resin foam was obtained. The mixing numbers of parts by weight and the evaluation results are presented in Table 2.

Example 18

The amount of the foam stabilizer of Example 13 was reduced to 5% by weight, the amount of the chemical foaming agent (B-1) was increased to 20% by weight, and the amount of the chemical foaming agent (B-2) was increased to 30% by weight. Thus, a modified silicone resin foam was obtained. The mixing numbers of parts by weight and the evaluation results are presented in Table 2.

Example 19

The foam stabilizer of Example 13 was changed to 5% by weight of [SH190 manufactured by Dow Corning Toray Co., Ltd.], the amount of the chemical foaming agent (B-1) was increased to 25% by weight, and the amount of the chemical foaming agent (B-2) was increased to 37% by weight. Thus, a modified silicone resin foam was obtained. The mixing numbers of parts by weight and the evaluation results are presented in Table 2.

Example 20

A base resin (A) [polymer A], a chemical foaming agent (B-1) [sodium hydrogen carbonate: manufactured. by Eiwa Chemical Industry Co., Ltd., FE-507], and a black pigment [carbon black, manufactured. by Asahi Carbon Co., Ltd., ASAHI THERMAL] were added and sufficiently mixed, and liquid A was produced. A chemical foaming agent (B-2) [salicylic acid: first grade salicylic acid manufactured by Kishida Chemical Co., Ltd.], water (C), a silanol condensation catalyst (D) [2-ethyl acid phosphate (manufactured by Johoku Chemical Co., Ltd., acidic phosphoric acid ester, JP-502)], and a foam stabilizer [TEGOSTAB B8123 manufactured by Evonik Japan. Co., Ltd.] were added and sufficiently mixed, and liquid B was produced. In an atmosphere at 23° C., liquid A and liquid B thus obtained were mixed in a mold or a graduated cylinder type disco cup, and thus a modified silicone resin foam was obtained. The mixing numbers of parts by weight and the evaluation results are presented in Table 2 and Table 6.

Comparative Example 1

A base resin (A) [polymer B]/[polymer D] and a chemical foaming agent (B-1) [sodium hydrogen carbonate: manufactured by Eiwa Chemical Industry Co., Ltd., FE-507] were added and sufficiently mixed, and liquid A was produced. A chemical foaming agent (B-2) [citric acid: manufactured by Eiwa Chemical industry Co., Ltd., CELLBORN SC-C], water (C), a silanol condensation catalyst. (D) [2-ethylhexyl acid phosphate (manufactured by Johoku Chemical Co., Ltd., acidic phosphoric acid ester, JP-508)], and a wetting agent [dimethylpolysiloxane KF-96-100CS manufactured by Shin-Etsu Chemical Co., Ltd.] were added and sufficiently mixed, and liquid. B was produced. In an atmosphere at 23° C., liquid A and liquid B thus obtained were mixed in a mold or a graduated cylinder type disco cup, and thus a modified silicone resin foam was obtained. The mixing numbers of parts by weight and the evaluation results are presented in Table 3.

Comparative Example 2

The amount of the chemical foaming agent (B-1) of Comparative Example 1 was increased to 7.5% by weight, and the amount of the chemical foaming agent (B-2) was increased to 7.5% by weight. Thus, a modified silicone resin foam was obtained. The mixing numbers of parts by weight and the evaluation results are presented in Table 3.

Comparative Example 3

The amount of the silanol condensation catalyst (D) of Comparative Example 2 was increased to 5% by weight, and thus a modified silicone resin foam was obtained. The mixing numbers of parts by weight and the evaluation results are presented in Table 3.

Comparative Example 4

The base resin (A) of Comparative Example 3 was changed to [polymer A], and thus a modified silicone resin foam was obtained. The mixing numbers of parts by weight and the evaluation results are presented in Table 3.

Comparative Example 5

The silanol condensation catalyst (D) of Comparative Example 4 was changed to [2-ethyl acid phosphate (manufactured by Johoku Chemical Co., Ltd., acidic phosphoric acid ester, JP-502)], and thus a modified silicone resin foam was obtained. The mixing numbers of parts by weight and the evaluation results are presented in Table 3.

Comparative Example 6

Water (C) was added to Comparative Example 5, and thus a modified silicone resin foam was obtained. The mixing numbers of parts by weight and the evaluation results are presented in Table 3.

Comparative Example 7

The chemical foaming agent (B-2) of Comparative Example 6 was changed to [acetic acid: manufactured by Kishida Chemical Co., Ltd., first grade acetic acid], and thus a modified silicone resin foam was obtained. The mixing numbers of parts by weight and the evaluation results are presented in Table 3.

Comparative Example 8

The chemical foaming agent (B-2) of Comparative Example 6 was changed to [lactic acid: manufactured by Kishida Chemical Co., Ltd., special grade lactic acid], and. thus a modified silicone resin foam was obtained. The mixing numbers of parts by weight and the evaluation results are presented in Table 4.

Comparative Example 9

The chemical foaming agent (B-2) of Comparative Example 6 was changed to [malic acid: manufactured by Kishida Chemical Co., Ltd., DL-malic acid], and thus a modified silicone resin foam was obtained. The mixing numbers of parts by weight and the evaluation results are presented in Table 4.

Comparative Example 10

The chemical foaming agent (B-2) of Comparative Example 6 was changed to [benzoic acid: manufactured by Kishida Chemical Co., Ltd., first grade benzoic acid], and thus a modified silicone resin foam was obtained. The mixing numbers of parts by weight and the evaluation results are presented in Table 4.

Comparative Example 11

The chemical foaming agent (B-2) of Comparative Example 6 was changed to [acetylsalicylic acid: manufactured by Wako Pure Chemical Industries, Ltd., special grade acetylsalicylc acid], and thus a modified silicone resin foam was obtained. The mixing numbers of parts by weight, and the evaluation results are presented in Table 4.

Comparative Example 12

The chemical foaming agent (B-2) of Comparative Example 6 was changed to [4-hydroxybenzoic acid: manufactured by Kishida Chemical Co., Ltd., first grade 4-hydroxybenzoic acid], and thus a modified silicone resin foam was obtained. The mixing numbers of parts by weight and the evaluation results are presented in Table 4.

Comparative Example 13

The amount of water (C) of Example 1 was reduced, and thus a modified silicone resin foam was obtained. The mixing numbers of parts by weight and the evaluation results are presented in Table 4.

Comparative Example 14

The amounts of water (C) and the foam stabilizer of Example 2 were increased, and thus a modified silicone resin foam was obtained. The mixing numbers of parts by weight and the evaluation results are presented in Table 4.

Comparative Example 15

A urethane resin foam of AGP200 manufactured by Compagnie de Saint-Gobain S.A. was purchased. The evaluation results are presented in Table 6.

Comparative Example 16

A two-liquid urethane resin foam of #212 manufactured by Fomo Japan, Inc. was purchased. The evaluation results are presented in Table 6.

TABLE 1

| | | | Example ||||||||||
| --- | --- | --- | --- | --- | --- | --- | --- | --- | --- | --- | --- | --- |
| | | | 1 | 2 | 3 | 4 | 5 | 6 | 7 | 8 | 9 | 10 |
| Polymer | (A) | Polymer A | 100 | 100 | 100 | 100 | 100 | 80 | 100 | | 100 | 100 |
| | | Polymer B | | | | | | | | | | |
| | | Polymer C | | | | | | | | 100 | | |
| | | Polymer D | | | | | | 20 | | | | |
| Foaming agent (B) | (B-1) | Sodium hydrogen carbonate (Bicarbonate): FE-507 | 7.5 | 7.5 | 7.5 | 7.5 | 7.5 | 7.5 | 7.5 | 7.5 | 7.5 | 7.5 |
| | (B-2) | Acetic acid (pKa: 4.79) | | | | | | | | | | |
| | | Lactic acid (pKa: 3.86) | | | | | | | | | | |
| | | Citric acid (pKa: 3.09) | | | | | | | | | | |
| | | Malic acid (pKa: 3.61) | | | | | | | | | | |
| | | Benzoic acid (pKa: 4.2) | | | | | | | | | | |
| | | Salicylic acid (pKa: 2.97) | 16 | 16 | 16 | 16 | 16 | 16 | 16 | 16 | 16 | 16 |
| | | Acetylsalicylic acid (pKa: 3.48) | | | | | | | | | | |
| | | 4-hydroxybenzoic acid (pKa: 4.57) | | | | | | | | | | |
| | | Chloroacetic acid (pKa: 2.65) | | | | | | | | | | |
| Water | (C) | Water | 3 | 3 | 2 | 9 | 3 | 3 | 3 | 3 | 6 | 6 |
| Silanol condensation catalyst | (D) | JP-508: 2-Ethylhexyl acid phosphate | | | | | | | | | | |
| | | JP-502: Ethyl acid phosphate | 5 | 5 | 5 | 5 | 10 | 5 | 5 | 5 | 50 | 80 |
| Other additives | | Plasticizer: Tetrabranched FA702NS | | | | | | 75 | | | | |
| | | Wetting agent: Dimethylpoly-siloxane KF-96-100CS | 5 | | | | | | | | | |
| | | Foam stabilizer: SH190 | | | | | | | | 5 | | |
| | | Foam stabilizer: SRX-298 | | 5 | 5 | 5 | 5 | 5 | | 5 | 5 | 5 |

TABLE 1-continued

|  |  | Example | | | | | | | | | |
|---|---|---|---|---|---|---|---|---|---|---|---|
|  |  | 1 | 2 | 3 | 4 | 5 | 6 | 7 | 8 | 9 | 10 |
|  | Foam stabilizer: B8123 | | | | | | | | | | |
|  | Reactivity regulating agent: Silicate MS56S | | | | | | | | | | |
|  | Cell regulating agent: ASAHI THERMAL (Black pigment) | | | | | | | | | | |
|  | Hollow particles: MATSUMOTO MICROSPHERE F-80DE | | | | | | | | | | |
| Curability 1 (≤5 minutes): Time without sagging (Minutes) | | 1 | 1 | 1 | 5 | 4 | 5 | 2 | 2 | 1 | 1 |
| Curability 2(<12 minutes): Tack-free time (Minutes) | | 7 | 7 | 5 | 11 | 7 | 12 | 10 | 10 | 1 | 1 |
| Initial expansion ratio: (≥5 times) | | 6 | 6 | 5 | 12 | 5 | 5 | 7 | 7 | 9 | 10 |
| Expansion ratio after 12 hours: (≥5 times) | | 6 | 6 | 5 | 12 | 5 | 5 | 7 | 7 | 8 | 8 |
| Density: kg/m³ (10-900 kg/m³) | | 200 | 200 | 240 | 100 | 240 | 240 | 171 | 171 | 150 | 150 |
| ASKER FP hardness meter ≤60 | | 25 | 28 | 35 | 0 | 0 | 20 | 30 | 35 | 10 | 10 |

TABLE 2

|  |  |  | Example | | | | | | | | | |
|---|---|---|---|---|---|---|---|---|---|---|---|---|
|  |  |  | 11 | 12 | 13 | 14 | 15 | 16 | 17 | 18 | 19 | 20 |
| Polymer | (A) | Polymer A | 100 | 100 | 100 | 100 | 100 | 100 | 100 | 100 | 100 | 100 |
|  |  | Polymer B | | | | | | | | | | |
|  |  | Polymer C | | | | | | | | | | |
|  |  | Polymer D | | | | | | | | | | |
| Foaming agent (B) | (B-1) | Sodium hydrogen carbonate (Bicarbonate): FE-507 | 7.5 | 15 | 15 | 15 | 15 | 15 | 15 | 20 | 25 | 27 |
|  | (B-2) | Acetic acid (pKa: 4.79) | | | | | | | | | | |
|  |  | Lactic acid (pKa: 3.86) | | | | | | | | | | |
|  |  | Citric acid (pKa: 3.09) | | | | | | | | | | |
|  |  | Malic acid (pKa: 3.61) | | | | | | | | | | |
|  |  | Benzoic acid (pKa: 4.2) | | | | | | | | | | |
|  |  | Salicylic acid (pKa: 2.97) | | 22 | 22 | 22 | 22 | 22 | 22 | 30 | 37 | 37 |
|  |  | Acetylsalicylic acid (pKa: 3.48) | | | | | | | | | | |
|  |  | 4-hydroxybenzoic acid (pKa: 4.57) | | | | | | | | | | |
|  |  | Chloroacetic acid (pKa: 2.65) | 15 | | | | | | | | | |
| Water | (C) | Water | 3 | 9 | 9 | 9 | 9 | 12 | 20 | 9 | 9 | 15 |
| Silanol condensation catalyst | (D) | JP-508: 2-Ethylhexyl acid phosphate | | | | | | | | | | |
|  |  | JP-502: Ethyl acid phosphate | 5 | 5 | 5 | 5 | 5 | 0 | 5 | 5 | 5 | 10 |
| Other additives |  | Plasticizer: Tetrabranched FA702NS | | | | | | | | | | |
|  |  | Wetting agent: Dimethylpoly-siloxane KF-96-100CS | | | | | | | | | | |
|  |  | Foam stabilizer: SH190 | | | | | | | | | 5 | |
|  |  | Foam stabilizer: SRX-298 | 5 | 10 | 10 | 10 | 10 | 10 | 10 | 5 | | |
|  |  | Foam stabilizer: B8123 | | | | | | | | | | 2 |
|  |  | Reactivity regulating agent: Silicate MS56S | | | 30 | 30 | 30 | 30 | 30 | 30 | 30 | |
|  |  | Cell regulating agent: ASAHI THERMAL (Black pigment) | | | | 1 | | | | | | 5 |
|  |  | Hollow particles: MATSUMOTO MICROSPHERE F-80DE | | | | | 1 | | | | | |
| Curability 1 (≤5 minutes): Time without sagging (Minutes) | | | 2 | 3 | 2 | 1 | 2 | 5 | 5 | 1 | 1 | 2 |
| Curability 2(<12 minutes): Tack-free time (Minutes) | | | 10 | 5 | 5 | 4 | 5 | 12 | 8 | 5 | 4 | 10 |
| Initial expansion ratio: (≥5 times) | | | 6 | 15 | 14 | 15 | 15 | 16 | 20 | 17 | 18 | 15 |
| Expansion ratio after 12 hours: (≥5 times) | | | 6 | 15 | 14 | 15 | 15 | 16 | 16 | 17 | 18 | 15 |
| Density: kg/m³ (10-900 kg/m³) | | | 200 | 80 | 85.7 | 80 | 80 | 75 | 75 | 70.6 | 66.7 | 80.0 |
| ASKER FP hardness meter ≤60 | | | 30 | 0 | 0 | 10 | 0 | 0 | 0 | 0 | 0 | 20 |

TABLE 3

|  |  |  | Comparative example | | | | | | |
|---|---|---|---|---|---|---|---|---|---|
|  |  |  | 1 | 2 | 3 | 4 | 5 | 6 | 7 |
| Polymer | (A) | Polymer A |  |  |  | 100 | 100 | 100 | 100 |
|  |  | Polymer B | 80 | 80 | 80 |  |  |  |  |
|  |  | Polymer C |  |  |  |  |  |  |  |
|  |  | Polymer D | 20 | 20 | 20 |  |  |  |  |
| Foaming agent (B) | (B-1) | Sodium hydrogen carbonate (Bicarbonate): FE-507 | 5 | 7.5 | 7.5 | 7.5 | 7.5 | 7.5 | 7.5 |
|  | (B-2) | Acetic acid (pKa: 4.79) |  |  |  |  |  |  | 7 |
|  |  | Lactic acid (pKa: 3.86) |  |  |  |  |  |  |  |
|  |  | Citric acid (pKa: 3.09) | 5 | 7.5 | 7.5 | 7.5 | 7.5 | 7.5 |  |
|  |  | Malic acid (pKa: 3.61) |  |  |  |  |  |  |  |
|  |  | Benzoic acid (pKa: 4.2) |  |  |  |  |  |  |  |
|  |  | Salicylic acid (pKa: 2.97) |  |  |  |  |  |  |  |
|  |  | Acetylsalicylic acid (pKa: 3.48) |  |  |  |  |  |  |  |
|  |  | 4-hydroxybenzoic acid (pKa: 4.57) |  |  |  |  |  |  |  |
|  |  | Chloroacetic acid (pKa: 2.65) |  |  |  |  |  |  |  |
| Water | (C) | 水 |  |  |  |  |  | 3 | 3 |
| Silanol condensation catalyst | (D) | JP-508: 2-Ethylhexyl acid phosphate | 0.5 | 0.5 | 5 | 5 |  |  |  |
|  |  | JP-502: Ethyl acid phosphate |  |  |  |  | 5 | 5 | 5 |
| Other additives |  | Plasticizer: Tetrabranched FA702NS |  |  |  |  |  |  |  |
|  |  | Wetting agent: Dimethylpoly-siloxane KF-96-100CS | 5 | 5 | 5 | 5 | 5 | 5 | 5 |
|  |  | Foam stabilizer: SH190 |  |  |  |  |  |  |  |
|  |  | Foam stabilizer: SRX-298 |  |  |  |  |  |  |  |
|  |  | Foam stabilizer: B8123 |  |  |  |  |  |  |  |
|  |  | Reactivity regulating agent: Silicate MS56S |  |  |  |  |  |  |  |
|  |  | Cell regulating agent: ASAHI THERMAL (Black pigment) |  |  |  |  |  |  |  |
|  |  | Hollow particles: MATSUMOTO MICROSPHERE F-80DE |  |  |  |  |  |  |  |
| Curability 1 (≤5 minutes): Time without sagging (Minutes) | | | 120 or more | 120 or more | 3 or more | 2 | 0.5 | 5 | One night or longer |
| Curability 2(<12 minutes): Tack-free time (Minutes) | | | One night or longer | One night | 40 or more | 20 | 1 | One night or longer | One night or longer |
| Initial expansion ratio: (≥5 times) | | | 1 | 1 | 1 | 1 | 1 | 7 | 6 |
| Expansion ratio after 12 hours: (15 times) | | | 1 | 1 | 1 | 1 | 1 | 1 | 1 |
| Density: kg/m³ (10-900 kg/m³) | | | 1200 | 1200 | 1200 | 1200 | 1200 | 1200 | 1200 |
| ASKER FP hardness meter ≤60 | | | 100< | 100< | 100< | 100< | 100< | 100< | 100< |

TABLE 4

|  |  |  | Comparative example | | | | | | |
|---|---|---|---|---|---|---|---|---|---|
|  |  |  | 8 | 9 | 10 | 11 | 12 | 13 | 14 |
| Polymer | (A) | Polymer A | 100 | 100 | 100 | 100 | 100 | 100 | 100 |
|  |  | Polymer B |  |  |  |  |  |  |  |
|  |  | Polymer C |  |  |  |  |  |  |  |
|  |  | Polymer D |  |  |  |  |  |  |  |
| Foaming agent (B) | (B-1) | Sodium hydrogen carbonate (Bicarbonate): FE-507 | 7.5 | 7.5 | 7.5 | 7.5 | 7.5 | 7.5 | 7.5 |
|  | (B-2) | Acetic acid (pKa: 4.79) |  |  |  |  |  |  |  |
|  |  | Lactic acid (pKa: 3.86) | 10.5 |  |  |  |  |  |  |
|  |  | Citric acid (pKa: 3.09) |  |  |  |  |  |  |  |
|  |  | Malic acid (pKa: 3.61) |  | 7.9 |  |  |  |  |  |
|  |  | Benzoic acid (pKa: 4.2) |  |  | 14.2 |  |  |  |  |
|  |  | Salicylic acid (pKa: 2.97) |  |  |  |  |  | 16 | 16 |

TABLE 4-continued

| | | | Comparative example | | | | | | |
|---|---|---|---|---|---|---|---|---|---|
| | | | 8 | 9 | 10 | 11 | 12 | 13 | 14 |
| | | Acetylsalicylic acid (pKa: 3.48) | | | | 21 | | | |
| | | 4-hydroxybenzoic acid (pKa: 4.57) | | | | | 16 | | |
| | | Chloroacetic acid (pKa: 2.65) | | | | | | | |
| Water | (C) | Water | 3 | 3 | 3 | 3 | 3 | 0.5 | 40 |
| Silanol condensation catalyst | (D) | JP-508: 2-Ethylhexyl acid phosphate | | | | | | | |
| | | JP-502: Ethyl acid phosphate | 5 | 5 | 5 | 5 | 5 | 5 | 5 |
| Other additives | | Plasticizer: Tetrabranched FA702NS | | | | | | | |
| | | Wetting agent: Dimethylpoly-siloxane KF-96-100CS | 5 | 5 | 5 | 5 | 5 | 5 | |
| | | Foam stabilizer: SH190 | | | | | | | |
| | | Foam stabilizer: SRX-298 | | | | | | | 10 |
| | | Foam stabilizer: B8123 | | | | | | | |
| | | Reactivity regulating agent: Silicate MS56S | | | | | | | |
| | | Cell regulating agent: ASAHI THERMAL (Black pigment) | | | | | | | |
| | | Hollow particles: MATSUMOTO MICROSPHERE F-8ODE | | | | | | | |
| Curability 1 (≤5 minutes): Time without sagging (Minutes) | | | 15 | One night or longer | One night | One night | 4 | 1 | 30 |
| Curability 2(<12 minutes): Tack-free time (Minutes) | | | One night | One night or longer | One night | One night | 90 | 3 | One night |
| Initial expansion ratio: (≥5 times) | | | 10 | 6 | 6 | 6 | 6 | 1 | 20 |
| Expansion ratio after 12 hours: (≥5 times) | | | 1 | 1 | 4 | 3 | 4 | 1 | 1 |
| Density: kg/m³ (10-900 kg/m³) | | | 1200 | 1200 | 300 | 400 | 300 | 1200 | 1200 |
| ASKER FP hardness meter ≤60 | | | 100< | 100< | 60 | 55 | 45 | 100< | 100< |

From the above-described results, it was made clear that the foams of Examples have excellent curability and expansion ratios and have satisfactory flexibility, compared to Comparative Examples. Specifically, an appropriate amount of water (C) is incorporated into the liquid resin composition, and an acidic compound having an acid dissociation constant pKa of 3.0 or less is used as the foaming agent (B-2). In Table 5, the acid dissociation constants of the foaming agents (B-2) are shown.

TABLE 5

| Acid dissociation constant | pKa: (1) | (2) | (3) | Source or reference |
|---|---|---|---|---|
| 1 Acetic acid | 4.79 | | | Calculated using Advanced Chemistry Development (ACD/Labs) Software V11.02 (© 1994-2016 ACD/Labs) |
| 2 Lactic acid | 3.86 | | | Dawson, R. M. C. et al., Data for Biochemical Research, Oxford, Clarendon Press, 1959. |
| 3 Citric acid | 3.09 | 4.75 | 6.41 | Dawson, R. M. C., et al., Data for Biochemical Research, Oxford, Clarendon Press, 1959. |
| 4 Malic acid | 3.61 | — | | Calculated using Advanced Chemistry Development (ACD/Labs) Software V11.02 (© 1994-2016 ACD/Labs) |
| 3 Benzoic acid | 4.2 | | | |
| 6 Salicylic acid | 2.97 | | | Drugbank. ca. Retrieved on 2012 Jun. 3. |
| 7 Acetylsalicylic acid | 3.48 | | | Calculated using Advanced Chemistry Development (ACD/Labs) Software V11.02 (© 1994-2016 ACD/Labs) |
| 8 4-Hydroxy-benzoic acid | 4.57 | | | |
| 9 Chloroacetic acid | 2.65 | | | |

TABLE 6

| Sample size 20 cm × 20 cm × 2.5 cm | | Example | | | Comparative example | |
|---|---|---|---|---|---|---|
| | | 1 | 12 | 20 | 15 | 16 |
| Product name | | — | — | — | AGP200 manufactured by Compagnie de Saint-Gobain S.A. | #212 manufactured by Fujimo Japan, Inc. |
| ASKER FP hardness | 23° C. | 25 | 0 | 20 | 30 | 96 |
| | −20° C. | 32 | 18 | 40 | 90 | 100< |
| | −40° C. | 44 | 25 | 70 | 100< | 100< |

From the above-described results, it was made clear that the foams of Examples can maintain flexibility even at low temperature, compared to Comparative Examples. When the FP hardness is higher than 90, the possibility of breaking at the time of deformation is increased. Therefore, it has been made clear that according to one or more embodiments of the present invention, a liquid resin composition that does not generate toxic cyanogen gas at the time of combustion, can maintain flexibility even at low temperature, and enables expansion molding to be completed in a short time period by mixing at room temperature, can be provided.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A liquid resin composition, comprising:
    a base resin (A) in an amount of 100 parts by weight;
    a chemical foaming agent (B) in an amount of 2 parts by weight or more and 100 parts by weight or less; and
    water (C) in an amount of 1 part by weight or more and 30 parts by weight or less, wherein the base resin (A) is a polymer having:
    a hydrolyzable group bonded to a silicon atom;
    at least one reactive silicon group that is capable of being crosslinked by forming a siloxane bond; and
    a main chain that is constituted by an oxyalkylene-based monomer unit, and
    wherein the chemical foaming agent (B) comprises a bicarbonate (B-1) and an acidic compound (B-2) having an acid dissociation constant pKa of 3.0 or less.

2. The composition according to claim 1, wherein the liquid resin composition is a multi-liquid type composition that comprises two or more different liquids.

3. The composition according to claim 2, wherein the liquid resin composition is composed of two different liquids, wherein the two liquids are liquid A, which includes the base resin (A) and the bicarbonate (B-1), and liquid B, which includes the acidic compound (B-2) and the water (C).

4. The composition according to claim 1, wherein the acidic compound (B-2) is an organic acid.

5. The composition according to claim 4, wherein the organic acid is a carboxylic acid or a sulfonic acid.

6. The composition according to claim 1, wherein the oxyalkylene-based monomer unit is oxypropylene.

7. The composition according to claim 1, wherein the base resin (A) has a number average molecular weight of 3,000 or more and 100,000 or less.

8. The composition according to claim 1, further comprising a silanol condensation catalyst (D).

9. The composition according to claim 1, further comprising one of the group consisting of hollow particles, a pigment, and a dye.

10. A method for producing a modified silicone resin foam, the method comprising curing and expanding the liquid resin composition according to claim 1 in an atmosphere at a temperature of −10° C. or higher and 40° C. or lower.

* * * * *